(12) United States Patent
Bailey

(10) Patent No.: US 8,065,262 B2
(45) Date of Patent: *Nov. 22, 2011

(54) COMPUTER-IMPLEMENTED MULTIDIMENSIONAL DATABASE PROCESSING METHOD AND SYSTEM

(75) Inventor: Christopher D. Bailey, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/907,170

(22) Filed: Oct. 19, 2010

(65) Prior Publication Data

US 2011/0035353 A1 Feb. 10, 2011

Related U.S. Application Data

(63) Continuation of application No. 10/965,690, filed on Oct. 14, 2004, now Pat. No. 7,831,615.

(60) Provisional application No. 60/512,154, filed on Oct. 17, 2003.

(51) Int. Cl.
*G06F 7/00* (2006.01)

(52) U.S. Cl. ........................................ 707/600; 707/741

(58) Field of Classification Search .................. None
See application file for complete search history.

(56) References Cited

U.S. PATENT DOCUMENTS

| | | | |
|---|---|---|---|
| 5,627,973 A | 5/1997 | Armstrong et al. | |
| 5,652,842 A | 7/1997 | Siegrist, Jr. et al. | |
| 5,767,854 A | 6/1998 | Anwar | |
| 5,799,286 A | 8/1998 | Morgan et al. | |
| 5,926,820 A | 7/1999 | Agrawal et al. | |
| 5,953,707 A | 9/1999 | Huang et al. | |
| 5,963,910 A | 10/1999 | Ulwick | |
| 5,999,908 A | 12/1999 | Abelow | |
| 6,009,407 A | 12/1999 | Garg | |
| 6,014,640 A | 1/2000 | Bent | |
| 6,029,139 A | 2/2000 | Cunningham et al. | |
| 6,078,892 A | 6/2000 | Anderson et al. | |
| 6,115,691 A | 9/2000 | Ulwick | |
| 6,151,582 A | 11/2000 | Huang et al. | |
| 6,182,060 B1 | 1/2001 | Hedgcock et al. | |
| 6,236,977 B1 | 5/2001 | Verba et al. | |
| 6,237,138 B1 | 5/2001 | Hameluck et al. | |
| 6,249,768 B1 | 6/2001 | Tulskie et al. | |
| 6,275,812 B1 | 8/2001 | Haq et al. | |

(Continued)

FOREIGN PATENT DOCUMENTS

WO      0111522      2/2001

OTHER PUBLICATIONS

De Prisco et al., "On Optimal Binary Search Trees", Information Processing Letters, vol. 45, pp. 249-253 (Apr. 1993).

(Continued)

*Primary Examiner* — Tim T Vo
*Assistant Examiner* — Thomas Meng
(74) *Attorney, Agent, or Firm* — Jones Day

(57) ABSTRACT

A computer-implemented system and method are provided to handle operations dealing with a multidimensional database. Information about the hierarchical structure of a multidimensional database is used when performing the operations upon the database. Operations including update, select and others are performed using the hierarchical structural information. Keys and indexes are used in accessing the hierarchical structural information.

12 Claims, 13 Drawing Sheets

U.S. PATENT DOCUMENTS

| | | | |
|---|---|---|---|
| 6,286,005 | B1 | 9/2001 | Cannon |
| 6,321,206 | B1 | 11/2001 | Honarvar |
| 6,341,240 | B1 | 1/2002 | Bermon et al. |
| 6,397,224 | B1 | 5/2002 | Zubeldia et al. |
| 6,456,999 | B1 | 9/2002 | Netz |
| 6,460,026 | B1 * | 10/2002 | Pasumansky ............... 707/737 |
| 6,470,344 | B1 | 10/2002 | Kothuri et al. |
| 6,484,179 | B1 | 11/2002 | Roccaforte |
| 6,502,077 | B1 | 12/2002 | Speicher |
| 6,526,526 | B1 | 2/2003 | Dong et al. |
| 6,546,135 | B1 | 4/2003 | Lin et al. |
| 6,581,068 | B1 | 6/2003 | Bensoussan et al. |
| 6,584,447 | B1 | 6/2003 | Fox et al. |
| 6,611,829 | B1 | 8/2003 | Tate et al. |
| 6,640,215 | B1 | 10/2003 | Galperin et al. |
| 6,728,724 | B1 | 4/2004 | Megiddo et al. |
| 6,735,570 | B1 | 5/2004 | Lacy et al. |
| 6,750,864 | B1 | 6/2004 | Anwar |
| 6,898,603 | B1 | 5/2005 | Petculescu et al. |
| 6,901,406 | B2 | 5/2005 | Nabe et al. |
| 6,907,382 | B2 | 6/2005 | Urokohara |
| 6,970,830 | B1 | 11/2005 | Samra et al. |
| 7,016,480 | B1 | 3/2006 | Saylor et al. |
| 7,031,955 | B1 | 4/2006 | De Souza et al. |
| 7,039,594 | B1 | 5/2006 | Gersting |
| 7,089,266 | B2 | 8/2006 | Stolte et al. |
| 7,092,918 | B1 | 8/2006 | Delurgio et al. |
| 7,133,876 | B2 | 11/2006 | Roussopoulos et al. |
| 7,171,427 | B2 | 1/2007 | Witkowski et al. |
| 7,177,854 | B2 | 2/2007 | Chun et al. |
| 7,346,538 | B2 | 3/2008 | Reardon |
| 7,370,366 | B2 | 5/2008 | Lacan et al. |
| 7,430,567 | B2 | 9/2008 | Goldstein et al. |
| 7,526,434 | B2 | 4/2009 | Sharp |
| 7,698,163 | B2 | 4/2010 | Reed et al. |
| 7,777,743 | B2 | 8/2010 | Pao et al. |
| 2002/0013757 | A1 | 1/2002 | Bykowsky et al. |
| 2002/0046096 | A1 | 4/2002 | Srinivasan et al. |
| 2002/0072953 | A1 | 6/2002 | Michlowitz et al. |
| 2002/0107723 | A1 | 8/2002 | Benjamin et al. |
| 2002/0116237 | A1 | 8/2002 | Cohen et al. |
| 2002/0123930 | A1 | 9/2002 | Boyd et al. |
| 2002/0126545 | A1 | 9/2002 | Warren et al. |
| 2002/0169654 | A1 | 11/2002 | Santos et al. |
| 2002/0169655 | A1 | 11/2002 | Beyer et al. |
| 2002/0178049 | A1 | 11/2002 | Bye |
| 2003/0023598 | A1 | 1/2003 | Janakiraman et al. |
| 2003/0078830 | A1 | 4/2003 | Wagner et al. |
| 2003/0083924 | A1 | 5/2003 | Lee et al. |
| 2003/0083925 | A1 | 5/2003 | Weaver et al. |
| 2003/0088458 | A1 | 5/2003 | Afeyan et al. |
| 2003/0097292 | A1 | 5/2003 | Chen et al. |
| 2003/0110072 | A1 | 6/2003 | Delurgio et al. |
| 2003/0110080 | A1 | 6/2003 | Tsutani et al. |
| 2003/0120584 | A1 | 6/2003 | Zarefoss et al. |
| 2003/0126010 | A1 | 7/2003 | Barns-Slavin |
| 2003/0208402 | A1 | 11/2003 | Bibelnieks et al. |
| 2003/0208420 | A1 | 11/2003 | Kansal |
| 2003/0236721 | A1 | 12/2003 | Plumer et al. |
| 2004/0093296 | A1 | 5/2004 | Phelan et al. |
| 2004/0111388 | A1 | 6/2004 | Boiscuvier et al. |
| 2004/0199781 | A1 | 10/2004 | Erickson et al. |
| 2004/0215613 | A1 * | 10/2004 | Colossi et al. ............... 707/100 |
| 2005/0033761 | A1 | 2/2005 | Guttman et al. |
| 2005/0066277 | A1 | 3/2005 | Leah et al. |
| 2005/0262108 | A1 | 11/2005 | Gupta |
| 2006/0212386 | A1 | 9/2006 | Willey et al. |
| 2007/0055482 | A1 | 3/2007 | Goodermote et al. |
| 2007/0174119 | A1 | 7/2007 | Ramsey et al. |
| 2007/0233621 | A1 | 10/2007 | De Souza et al. |

OTHER PUBLICATIONS

Pedersen, Torben Bach et al., "Multidimensional Database Technology", IEEE, Computer, vol. 34, Issue 12, pp. 40-46 (Dec. 2001).

Balintfy et al, Binary and Chain Comparisons with an Experimental Linear Programming Food Price Index, The Review of Economics and Statistics, vol. 52, No. 3, pp. 324-330 (Aug. 1970).

Baud, Nicolas et al., "Internal data, external data and consortium data for operational risk measurement: How to pool data properly?", Groupe de Recherche Operationnelle, Credit Lyonnais, France, pp. 1-18 (Jun. 1, 2002).

Beamon, "Supply chain design and analysis: models and methods," International Journal of Production Economics (1998).

Cohen et al., "SAS/OR Optimization Procedures, with Applications to the Oil Industry," SAS Institute, SUGI Proceedings (1994).

Cook et al., "Evaluating Suppliers of Complex Systems: A multiple criteria approach," The Journal of the Operational Research Society (Nov. 1992).

Hollander, Geoffrey, "Modell deftly parses customer characteristics", InfoWorld, vol. 20, No. 21, pp. 1-4, retrieved from Dialog, file 148 (May 25, 1998).

Horngren, Charles T. et al., "Cost Accounting A Managerial Emphasis", Tenth Edition, Chapter 14, pp. 497-534 (2000).

Johnson, Ellis et al, Recent Developments and Future Directions in Mathematical Programming, IBM Systems Journal, vol. 31, No. 1, pp. 79-93 (1992).

Kearney, "Advances in Mathematical Programming and Optimization in the SAS System," SAS Institute, SUGI Proceedings (1999).

Lee, Eon-Kyung et al., "An effective supplier development methodology for enhancing supply chain performance," ICMIT (2000).

Lee, Eon-Kyung et al., "Supplier Selection and Management system Considering Relationships in Supply Chain Management," IEEE Transactions on Engineering Management (Aug. 2001).

Manchanda et al, The "Shopping Basket"; A Model for Multi-Category Purchase Incidence Decisions, Marketing Science, vol. 18, pp. 95-114 (Nov. 2, 1999).

Medaglia, Andres, "Simulation Optimization Using Soft Computing," dissertation for Operations Research Department at North Carolina State University (Jan. 24, 2001).

Na, H.S. et al., "Data Scaling for Operational Risk Modelling", ERIM Report Series Research in Management, 24 pp. (Dec. 2005).

Peemoller, Fred A., "Operational Risk Data Pooling", Frankfurt/Main, Deutsche Bank AG, 38 pp. (Feb. 7, 2002).

Porter-Kuchay, Multidimensional Marketing, Target Marketing (Jan. 2000).

Rosen, Michele, "There's Gold in That There Data", Insurance & Technology, vol. 23, No. 12, pp. 1-6,, retrieved from Dialog, file 16 (Dec. 1998).

Saarenvirta, Data Mining to Improve Profitability, CMA Magazine, vol. 72, No. 2, pp. 8-12 (Mar. 1998).

Samudhram, Ananda, "Solver setting for optimal solutions," New Straits Times (Nov. 22, 1999).

Spiegelman, "Optimizers Assist in Specialized marketing Efforts," Computer Reseller News (Nov. 22, 1999).

Business Wire, "Unica Releases Model 1 Enterprise Edition," retrieved from Proquest Direct, pp. 1-3 (Oct. 29, 1998).

Business Wire, "Perfect and Open Ratings Form Alliance to Provide Critical Supplier Performance Ratings to Private Exchanges and Net Markets" (Oct. 30, 2000).

Data Mining News, Looking Past Automation, MarketSwitch Focuses on Optimization of Marketing Campaigns, Data Mining News (May 10, 1999).

"i2 Technologies: i2 releases i2 five.two—the complete platform for dynamic value chain management; flexible, intuitive, powerful solutions designed to help companies gain efficiencies and drive revenue", M2 Presswire (Oct. 25, 2001).

Modell by Group 1 Software, www.g1.com, retrieved from Google.com and archive.org., pp. 1-16 (Aug. 29, 1999).

SAS Institute, Inc., www.sas.com, retrieved from Google.com and archive.org, pp. 1-28 (Jan. 29, 1998).

Millin, Vincent, Jun. 22, 2004 International Search Report from PCT/US03/13394 (1 pg.).

* cited by examiner

| RECORD # | ITEM | BUYER | COST |
|---|---|---|---|
| 1 | SHRIMP | BUBBA GUMP | $62.45 |
| 2 | WORMS | SHIRLEY GUMP | $11.76 |
| ... | ... | ... | ... |
| N | ... | ... | ... |

Fig. 3

ITEM DIMENSION HIERARCHY:
* BAIT
  -SHRIMP
  -WORMS

BUYER DIMENSION HIERARCHY:
* GUMP FAMILY
  -BUBBA GUMP
  -SHIRLEY GUMP

| RECORD # | ITEM | BUYER | COST |
|---|---|---|---|
| 1 | SHRIMP | BUBBA GUMP | $62.45 |
| 2 | WORMS | SHIRLEY GUMP | $11.76 |
| ... | ... | ... | ... |
| N | ... | ... | ... |

Fig. 4

| SELLER/BUYER | SOME GUMP | BUBBA | SHIRLEY | ALL STORES | LAKE | POND |
|---|---|---|---|---|---|---|
| SOME GUMP | | | | | | |
| BUBBA | | | | | | |
| SHIRLEY | | | | | | |
| ALL STORES | | | | | | |
| LAKE | | | | | | YES |
| POND | | | | | YES | |

Fig. 12

BUYER DIMENSION HIERARCHY:
* GUMP FAMILY
  - BUBBA GUMP
  - SHIRLEY GUMP
* ALL STORES
  - LAKE STORE
  - POND STORE

| SELLER | ITEM | BUYER | COST |
|---|---|---|---|
| LAKE STORE | SHRIMP | BUBBA GUMP | $62.45 |
| POND STORE | WORMS | SHIRLEY GUMP | $11.76 |
| POND STORE | WORMS | LAKE STORE | $500.00 |
| ... | ... | ... | ... |

Fig. 13

SELLER DIMENSION HIERARCHY AND VALUES:
* ALL STORES (TOTAL = $574.21)
  - LAKE STORE (TOTAL = $62.45)
    - $62.45 TO BUBBA
  - POND STORE (TOTAL = $511.76)
    - $11.76 TO SHIRLEY
    - $500.00 TO LAKE STORE

| SELLER | ITEM | BUYER | COST |
|---|---|---|---|
| LAKE STORE | SHRIMP | BUBBA GUMP | $62.45 |
| POND STORE | WORMS | SHIRLEY GUMP | $11.76 |
| POND STORE | WORMS | LAKE STORE | $500.00 |
| ... | ... | ... | ... |

Fig. 14

SELLER DIMENSION HIERARCHY:
* ALL STORES (TOTAL=$74.21)
  -LAKE STORE (TOTAL=$62.45)
    -$62.45 TO BUBBA
  -POND STORE (TOTAL=$511.76)
    -$11.76 TO SHIRLEY
    -$500.00 TO LAKE STORE ← 420

| SELLER | ITEM | BUYER | COST |
|---|---|---|---|
| LAKE STORE | SHRIMP | BUBBA GUMP | $62.45 |
| POND STORE | WORMS | SHIRLEY GUMP | $11.76 |
| POND STORE | WORMS | LAKE STORE | $500.00 |
| ... | ... | ... | ... |

*Fig. 15*

SELLER DIMENSION HIERARCHY:
* ALL STORES ← 444
  -LAKE STORE ← 440
  -POND STORE ← 442

| SELLER | ITEM | BUYER | COST |
|---|---|---|---|
| LAKE STORE | SHRIMP | BUBBA GUMP | $62.45 |
| POND STORE | WORMS | SHIRLEY GUMP | $11.76 |
| POND STORE | WORMS | LAKE STORE | $500.00 |
| ... | ... | ... | ... |

*Fig. 16*

| SELLER/BUYER | SOME GUMP | BUBBA | SHIRLEY | ALL STORES | LAKE | POND |
|---|---|---|---|---|---|---|
| SOME GUMP | | | | | | |
| BUBBA | | | | | | |
| SHIRLEY | | | | | | |
| ALL STORES | | | | | | | ALL STORES |
| LAKE | | | | | | ALL STORES | |
| POND | | | | | | | |

*Fig. 17*

COMPUTER-IMPLEMENTED MULTIDIMENSIONAL DATABASE PROCESSING METHOD AND SYSTEM

CROSS-REFERENCE TO RELATED APPLICATION

This application is a continuation of U.S. patent application Ser. No. 10/965,690 filed on Oct. 14, 2004 now U.S. Pat. No. 7,831,615, which claims priority of U.S. Provisional Patent Application Ser. No. 60/512,154, filed Oct. 17, 2003. By this reference, the full disclosures, including the drawings, of said U.S. patent applications are incorporated herein.

BACKGROUND

1. Technical Field

The present invention is generally directed to database operations, and more particularly to multidimensional database processing operations.

2. Description of the Related Art

Database technology has evolved to where multidimensional data can be stored and retrieved. In a multidimensional database, data is categorized into measures which are numerical in nature and into textual dimensions which characterize the measures. The textual dimensions have hierarchies and have found utility in many fields, including the data warehousing field and the Online Analytical Processing (OLAP) field.

Despite the evolution of database technology, operations involving multidimensional data can be time consuming and resource intensive. An example of such an operation is querying the different dimensions in the database. Traditionally, to get a specific answer to a query of a multidimensional database, all the answers have to be calculated. This involves matching character strings in the query to each dimension hierarchy by completely walking through the hierarchy tree. A query may take time O (Size Dimension1*Size Dimension2*Size Dimension3, . . . ), where "Size Dimension" is the number of discrete values in a dimension.

SUMMARY

In accordance with the teachings disclosed herein, a computer-implemented system and method are provided to handle operations dealing with a multidimensional database. Information about the hierarchical structure of a multidimensional database is used when performing the operations upon the database. Operations such as update, select and others are performed using the hierarchical structural information. Keys and indexes may be used in accessing the hierarchical structural information.

BRIEF DESCRIPTION OF THE DRAWINGS

FIGS. 3 and 4 illustrate values and dimensions in an exemplary multidimensional database;

FIGS. 11-17 are tables used in an example involving ICE processing;

DETAILED DESCRIPTION

Figure 1:
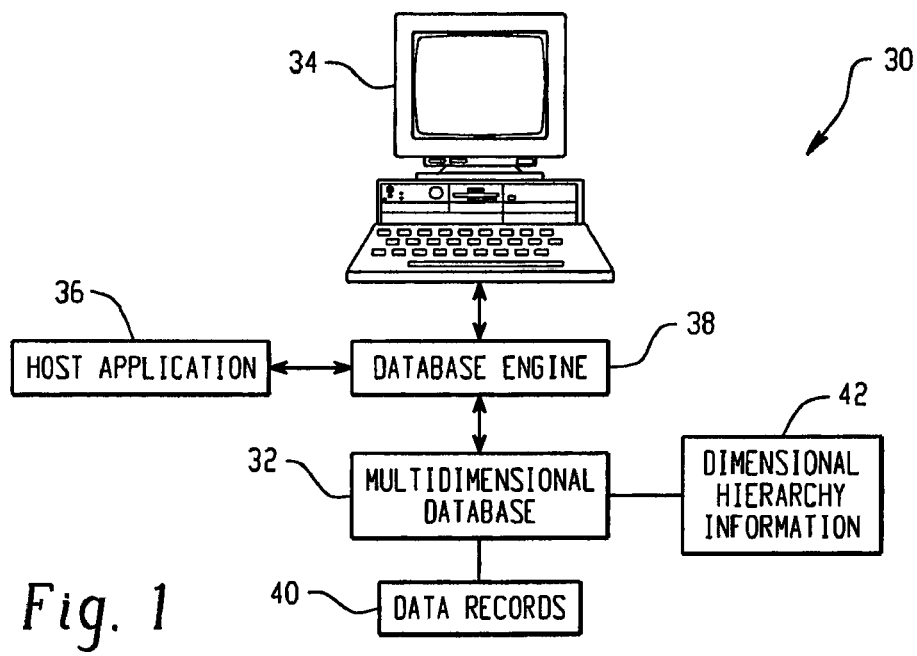
FIG. 1 is a block diagram depicting computer and software components for use with a multidimensional database.

FIG. 1 depicts at 30 a system for use with a multidimensional database 32. An end user 34 or a host application 36 (such as a data warehousing application, or an Online Analytical Processing (OLAP) or a data mining application) initiates a query to the multidimensional database 32 via a database engine (38). The database engine 38 processes the query, such as by parsing and translating, optimizing, and evaluating in order to formulate a logical expression from the query.

The logical expression can be in the form of a plurality of terms connected via a plurality of operators such as logical operators, relational operators, arithmetic operators, etc. The engine 38 then scans the multidimensional database 32 to locate and relate data records 40 that fulfill the logical expression and return the results to the end user 34 or host application 36.

Dimensional hierarchy data 42 is provided to assist in the location of the data records 40. The dimensional hierarchy data 42 describes the hierarchy of the dimensions contained within the database 32. As an illustration, the dimensional hierarchy data 42 may describe which dimensions in the database 32 are parents of other dimensions.

The results can be the data records themselves, such as a single data record for a singleton answer or a group of data records for an answer grid. However, it should be understood that many different types of results can be provided, such as an answer matrix in a plurality of dimensions, or can be the result of an operation on the data records such as in the form of summation of the data records.

Figure 2:
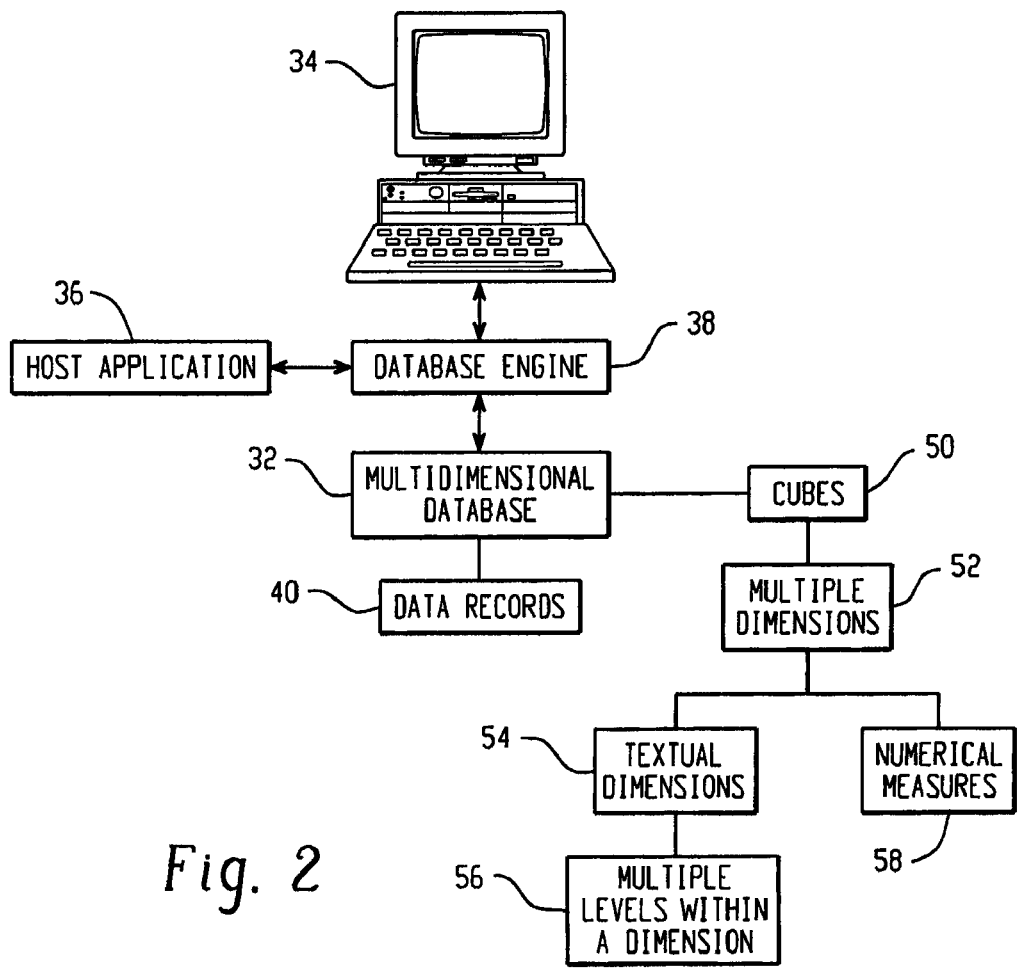
FIG. 2 is a block diagram depicting characteristics of a multidimensional database.

FIG. 2 illustrates characteristics of a multidimensional database 32. In a multidimensional database 32, data records 40 contain numerical measures 58 and textual (e.g., feature) dimensions 54 that characterize the numerical measures 58. The multidimensional database 32 views data records 40 as cubes 50 that contain hierarchies of the dimensions 52. Stated another way, a cube 50 represents a particular set of dimensions that the user can use to view the data records 40.

The dimensions 52 of the database's cubes are used for selecting and aggregating data at the desired level of detail. A textual dimension 54 is organized into a hierarchy composed of multiple levels 56, each representing a level of detail required by the desired analysis. For example, a textual dimension could contain geography information. The textual dimension could be arranged hierarchically starting from a general geographical designation to a more specific one— e.g., the geography hierarchy could be arranged at a state level which could decompose to a county geographical level which could decompose even further, such as to a city or township geographical level. A more detailed example about the characteristics of a multidimensional database 32 is discussed with reference to FIGS. 3 and 4.

FIG. 3 shows at 100 a portion of an exemplary multidimensional database. In this example, the data records are numbered in column 102. Each record contains "Cost" numerical values in column 104. Columns 106 and 108 contain textual information that provide context for a cost measure. Column 106 provides context about what "Item" is the subject of the cost in column 104. Similarly, column 108 provides context about who the "Buyer" is that purchased the "Item." As an illustration, record 110 specifies that "Bubba Gump" was the buyer of the item "shrimp." The cost of the purchase was $62.45. The discrete values for record 110 (e.g., "Shrimp") are also known as elements.

For the exemplary multidimensional database, the dimensions "Item" and "Buyer" can be further represented as having the multiple dimensional levels shown in FIG. 4. As shown at 120, the "Item" dimension can have a hierarchy wherein a particular level within the hierarchy is specifically directed to "Bait" items. The "Bait" level contains elements or values "Shrimp", "Worms", etc. For the Buyer dimension as shown at 130, the "Buyer" dimension can have a hierarchy wherein a particular level within the hierarchy is the "Gump Family" (i.e., where the Gump Family are the buyers). The "Bait" level contains elements or values "Bubba Gump", "Shirley Gump", etc.

Figure 5:
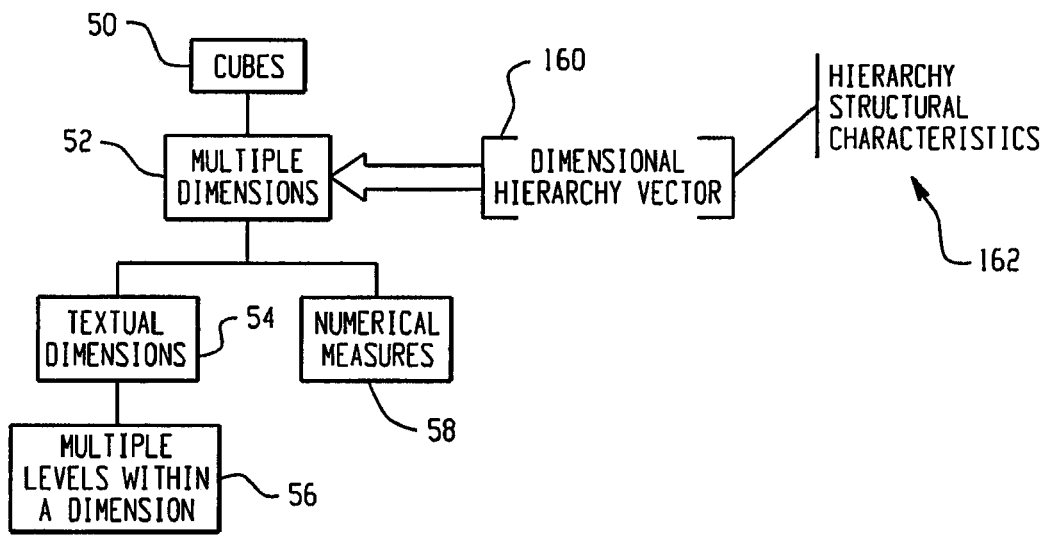
FIG. 5 is a block diagram depicting use of a dimensional hierarchy vector.

As illustrated in FIG. 5, a data structure 160 is depicted that searches data records in the multidimensional database. The vector data structure 160 defines the database's dimensional hierarchy structural characteristics 162. As discussed above, an element is an instance or value of the hierarchy. For example, the hierarchy vector 160 would indicate which hierarchical level is a child of another hierarchical level—e.g., the "Bait" hierarchical level is a child of the "Item" dimension.

Figure 6:
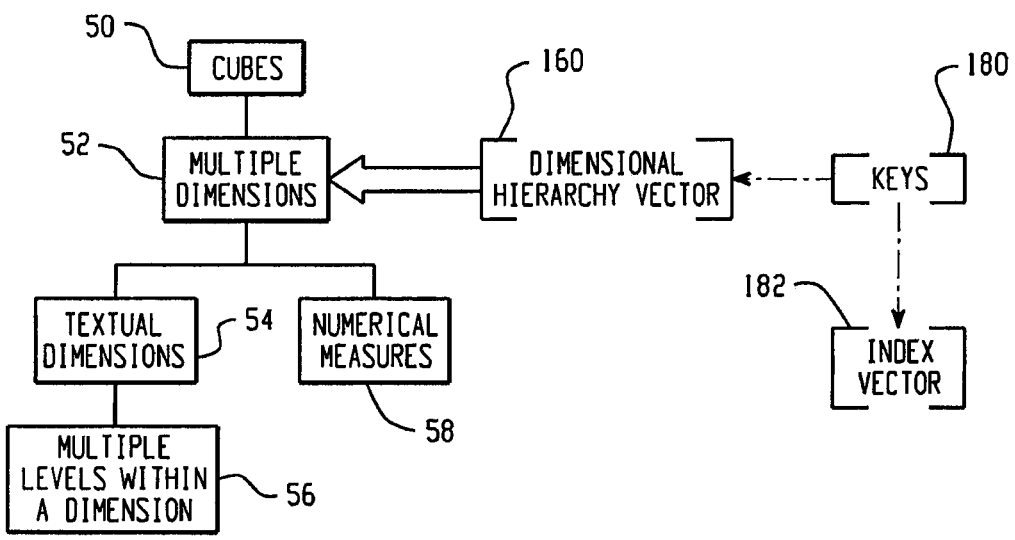
FIG. 6 is a block diagram depicting keys and an index vector for use in accessing a dimensional hierarchy vector.

If desired, operations dealing with the dimensional hierarchy vector 160 may be augmented with additional data structures. As an illustration, FIG. 6 shows keys 180 being used to locate information more efficiently within the dimensional hierarchy vector 160. A key is created for each element contained in the dimensional hierarchy vector 160. Stated otherwise, each key 180 corresponds to an element in the hierarchy and acts as an index to the dimensional hierarchy vector 160. The collection of keys 180 forms an index vector 182.

There are many ways to implement the data structures. One example implementation for constructing a dimensional hierarchy vector 160 is to build a containment vector. With reference back to the "Bait" exemplary multidimensional database, the dimension "Item" has three elements (e.g., instances): "Bait", "Shrimp", "Worms." The dimensional hierarchy vector creation process can be illustrated as follows:

ITEM={"Bait"={"Shrimp", "Worms"} which becomes

ITEM={1 ("Bait")={2 ("Shrimp"), 3 ("Worms")} which becomes

ITEM={1={2, 3}}

To illustrate the use of this containment vector notation, if item 1 is a parent categorization of items 2 and 3, then the hierarchy vector for "Bait"=Item"Bait"ContainmentVector={true, true, true}={1, 1, 1}—that is, item 1 contains itself and its children. The hierarchy vector for "Shrimp"=Item"Shrimp"ContainmentVector={false, true, false}={0, 1, 0}—that is, Item 2 does not contain its parent, does contain itself, and does not contain Item 3. The hierarchy vector for "Worms"=Item"Worms"ContainmentVector={false, false, true}={0, 0, 1}—that is, Item 3 does not contain its parent, does contain itself, and does not contain Item 2.

There are many ways of creating a key index 182 for such dimensional hierarchy vectors 160, provided that it allows a unique identifier for each dimensional hierarchy vector 160. For example, a number based on the dimensional hierarchy vector 160 such as 5 (i.e., $1 \times 2^2 + 0 \times 2^1 + 1 \times 2^0$) for "Bait", 2 (i.e., $0 \times 2^2 + 1 \times 2^1 + 0 \times 2^0$) for "Shrimp", 1 (i.e., $0 \times 2^2 + 0 \times 2^1 + 1 \times 2^0$) for "Worms" can be used, or an enumerating sequential number "1", "2", "3" can be used, or the dimensional hierarchy vector itself may be used as a "key."

For example, a query like "Is Shrimp the child of Bait?" is equivalent to the logical expression: {IF (Item"Bait"ContainmentVector(Shrimp))}. The answer to this query can be computed by multiplying the "Shrimp" hierarchy vector (Item"Shrimp"ContainmentVector) by the "Bait" hierarchy vector (Item"Bait"ContainmentVector). If the result is not zero, "Shrimp" is the child of "Bait"; or the answer can be obtained by examining the value of an element within the containment vector (Item"Bait"ContainmentVector) where the element position corresponds to "Shrimp." Note that the enumerating sequential number "1", "2", "3" may be used as the "key" to the containment vector. For this example, the containment vector has three elements "Bait" in position "1", "Shrimp" in position "2", and "Worms" in position "3". So Item"Bait"ContainmentVector=[1 1 1]. The second position corresponding to "Shrimp" is "1" (not zero), so "Shrimp" is contained within "Bait", in other words, "Shrimp" is a child of "Bait". Based on the same principle, other logical expressions can be similarly computed. The index vector for each data record could then be defined as [Key_ITEM, Key_BUYER].

Figures 7, 8:
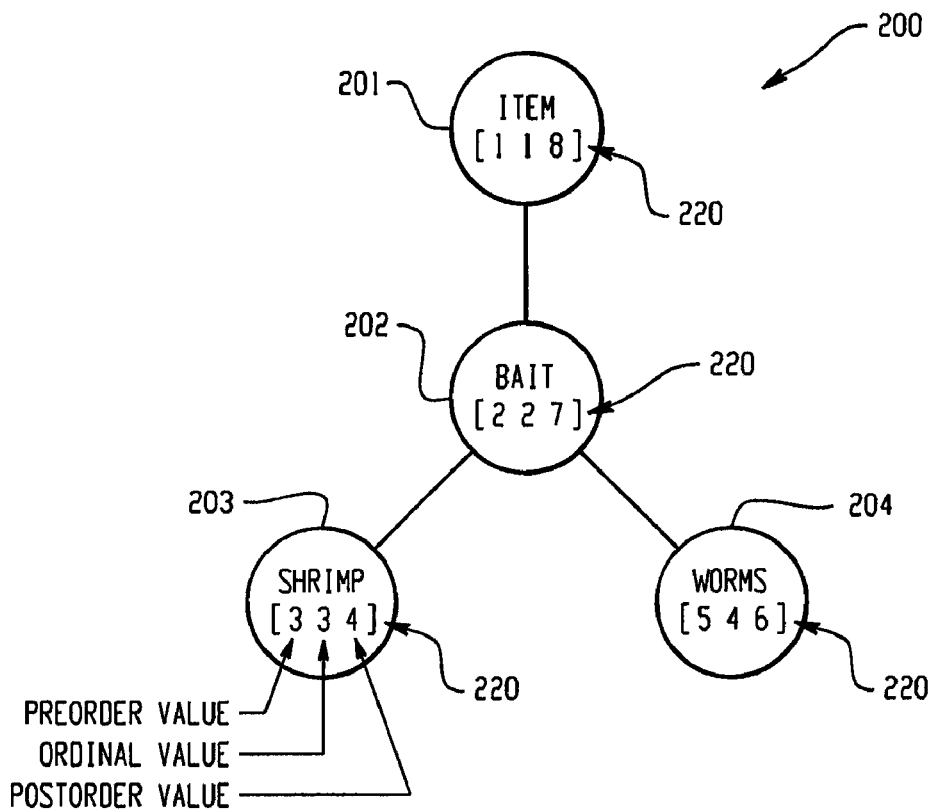
FIG. 7 is a directed acyclic graph for use with a dimensional hierarchy vector.
FIG. 8 is a table representing an example of a normalized multidimensional database.

Instead of a containment vector for use as a dimensional hierarchy vector 160, the hierarchy may be modeled as a DAG (directed acyclic graph). Preorder, ordinal and postorder values can provide the same or equivalent answer as in the containment vector approach. For example take the "Item" dimension as a tree as shown at 200 in FIG. 7. The tree's head node 201 has an ordinal value of "1." Node 202 has an ordinal value of "2;" node 203 has an ordinal value of "3;" and node 204 has an ordinal value of "5." Now scan the tree 200 as far left as possible, always counting, then going back up and down and increasing the number (e.g., a depth first search). More specifically, the tree scan begins at node 201, then proceeds to node 202 and then node 203. The scan then goes back up to node 202 and back down to node 204 and so on.

The order in which the node appears during the scanning is preserved in the form of preorder and postorder values for each node. Based upon the scanning order, the dimensional hierarchy vector for each element (instance) for "Item" based on preorder, ordinal and postorder values (shown at 220) is [preorder, ordinal, postorder]:

ITEM=[1, 1, 8]
Bait=[2, 2, 7]
Shrimp=[3, 3, 4]
Worms=[5, 4, 6]

Note that this dimensional hierarchy vector 160 defines the relationships among the elements (instances) of the hierarchy. For example, "Shrimp" is the child of "Bait," and evaluation of the logical expression "Shrimp.preorder (3)>=Bait.preorder (2) && Shrimp.postorder (4)<=Bait.postorder (7)" will be able to identify this relationship.

The key can be chosen as the ordinal value of the dimensional hierarchy vector 160. So Key_ITEM=2 will point to "Bait" because "Bait" is second in the order of the items; Key_ITEM=3 will point to "Shrimp." Similarly, the dimensional hierarchy vectors for the "Buyer" dimension will be:

BUYER=[1, 1, 8]
Gump Family=[2, 2, 7]
Bubba Gump=[3, 3, 4]
Shirley Gump=[5, 4, 6]

The index vector for each database can be defined as [Key_ITEM, Key_BUYER]. The exemplary multidimensional database can then be normalized by the index vector. To use the DAG modeling discussed above as an example, the normalized database will contain records such as those shown in FIG. 8. As an illustration, the normalized database 250 contains the value "3" in cell 252 because the original value "Shrimp" has been replaced by its key value "3."

Figure 9:
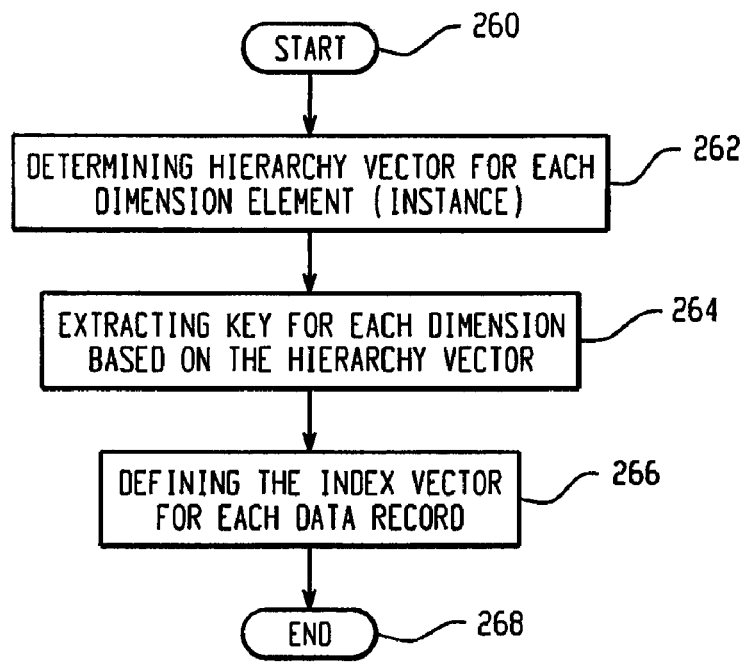
FIG. 9 is a flow chart illustrating an indexing operational scenario for use with a multidimensional database.

FIG. 9 illustrates an example construction of the data structures discussed above. Start indication block 260 indicates that step 262 determines a hierarchy vector for the dimension elements. Step 264 extracts a key for each dimension based upon the hierarchy vector. Step 266 defines the index vector for the data records based upon the keys. The creation process terminates at end block 268 unless additional data needs to be generated for the data structures.

Figure 10:
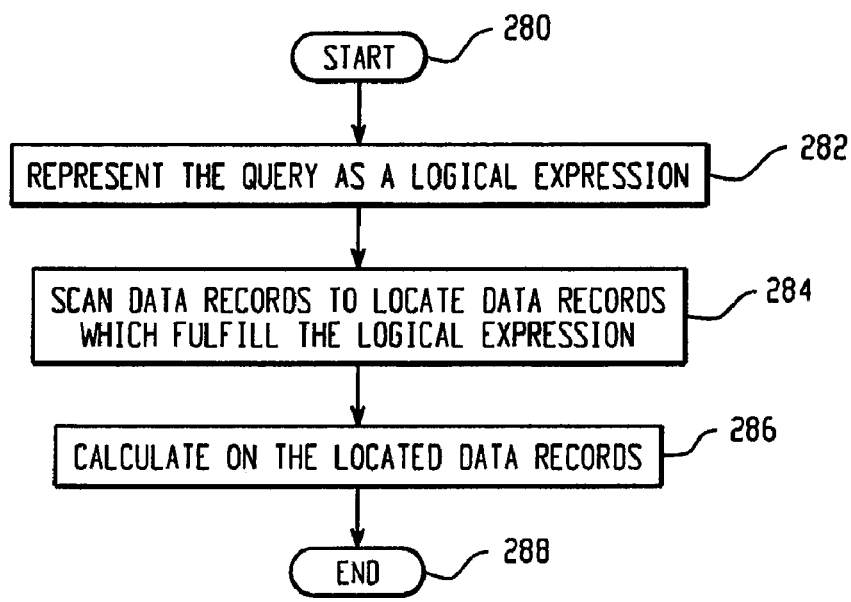
FIG. 10 is a flow chart illustrating a query processing operational scenario method which provides constant process time for a data record.

The generated data structures may then be used for query processing. FIG. 10 illustrates the operation 280 of a query processing method which provides constant process time for accessing a data record. At step 282, the query is processed. The processing may involve steps of parsing, translation, optimization, and query evaluation. The end result of step 282 is a formulated logical expression. The logical expression is a plurality of terms based on the above described hierarchy vector that is connected using a plurality of logical operators, relational operators and arithmetic operators.

For the database normalized by the index vector as described above, the logical expression is used to relate the data record to an answer grid. The method scans at step 284 the data records in the normalized multidimensional database using the logical expression generated in step 282. This is done in order to locate the data records which fulfill the logical expression. If desired at step 286, additional results may be calculated that fulfill the logical expression. For example, summation results would be calculated at step 286 if requested by the user. The method terminates at end block 288 by returning the retrieved records and/or calculated results to the end user or host application.

It is noted that the step of scanning in the operational scenario of FIG. 10 takes constant time (O(1)) to access a data record. Overall, the time it takes to scan the whole database with "N" records in the operational scenario of FIG. 10 will take O(N) time instead of O(N*Size Dimension1*Size Dimension2*Size Dimension3, . . . ) as required by traditional methods. For example, the operational scenario replaces linear scanning of character strings in each dimension with a single index query. The processing time for each data record is independent of the number of children in any dimension hierarchy.

The scanning of the normalized database involves a single pass algorithm. The scanning algorithm can be a linear scan algorithm. Note that if the index is generated based on preorder and postorder indices when representing a dimension hierarchy as a directed acyclic graph (DAG), the single pass algorithm can take the form of a preorder traversal or a postorder traversal. Additionally, the operational scenario does not impose any constraint on the dimension hierarchy. The operational scenario may be used with many types of multidimensional databases, such as those with a "ragged" hierarchy.

The operational scenario eliminates the calculation of intermediate answers by directly computing final answers through use of the dimensional hierarchy vector (and index vector if used). In others words, it can quickly answer queries, such as, but not limited to, what is the single value that answers a query that has:

- A single choice from the "Buyer" classification set (e.g., Bubba or Shirley or the Gumps).
- A single choice from the "Item" classification set (e.g., Shrimp or Worms or Bait).
- A single choice from the "Seller" classification set (e.g., Lake Store or Pond Store or All Stores).

So pre-aggregation of a large multidimensional database is possible because the fully populated answer cube can be built much faster than before. This is due at least in part to the single pass process described above in FIG. 10. The process can also be used to provide an answer matrix in the way similar to a full answer cube.

The process also can incorporate any expression into the query because the query is represented as a logical expression in the form of a plurality of terms connected via a one or more operators. The process takes constant time to access a single data record even if extra expressions are incorporated into the query.

These traits of the process can be used in a variety of applications. As examples, two applications will be illustrated: the first application solves the "double costing" or "inter-company-elimination" (ICE) problem; the second application involves a double indirection for discrete siblings situation.

Figure 11:
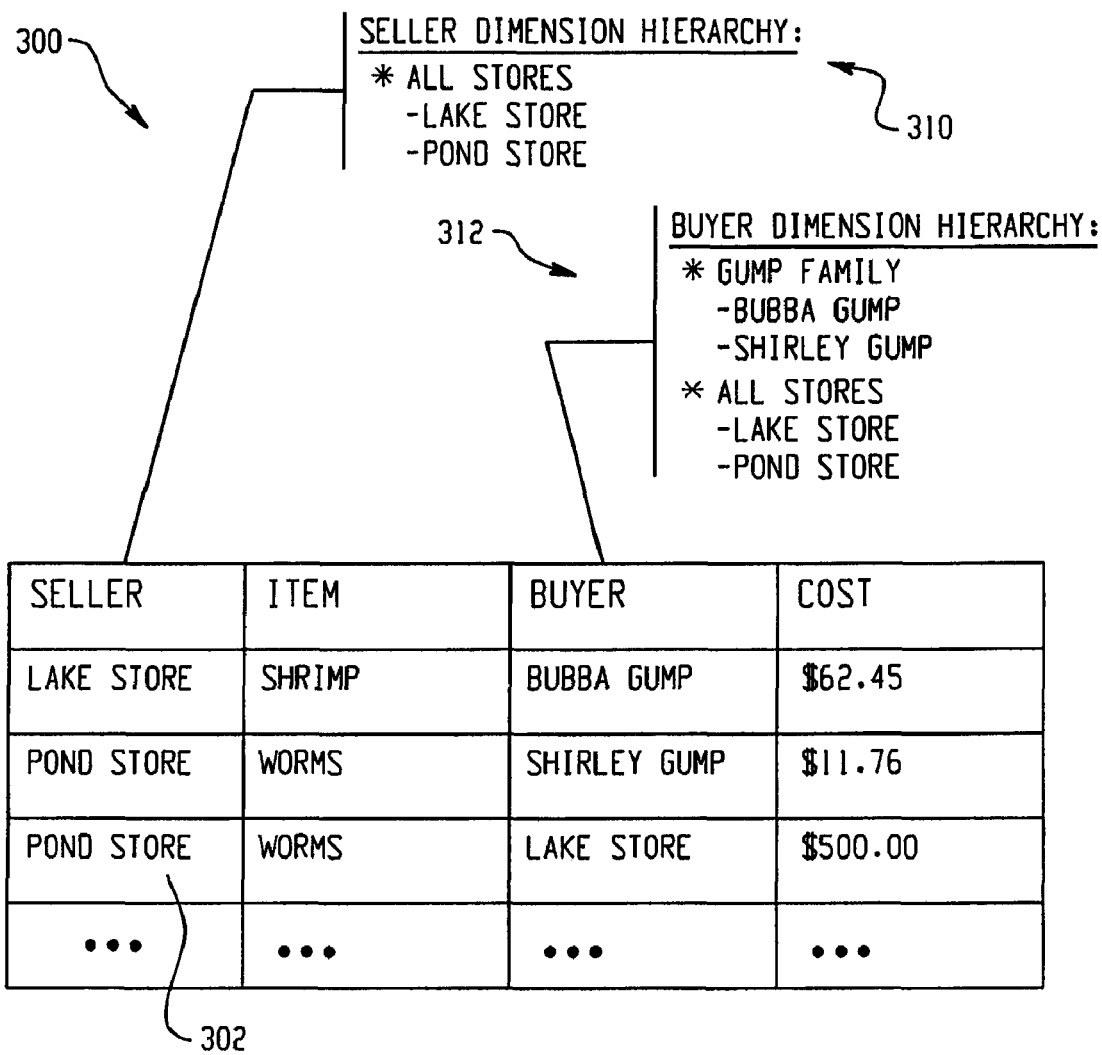

An ICE problem involves properly processing records so that transactions are not included that have the seller and buyer from the same or equivalent company. The data records 300 shown in FIG. 11 are provided as an example in handling an ICE situation. The ICE problem in this example involves not including an "Item" sold in a "Seller's" parent company's report that counts items sold if the "Buyer" is also a child or subsidiary of that same parent—e.g., if we are doing a summary of worms sold by our company, we do not want to include how many worms we sold to ourselves.

In the example, "Lake Store" and the "Pond Store" are related companies as shown in the Seller dimension hierarchy 310 and the Buyer dimension hierarchy 312 where "All Stores" contains both the "Lake Store" and the "Pond Store." In handling the ICE situation, data record 302 should not be included in the answer to the user. This is due to data record 302 having "Pond Store" as the seller and "Lake Store" as the buyer.

The table 350 of FIG. 12 addresses this ICE problem by delineating which transactions involve an inter-company transaction. The table 350 answers "is this an inter-company trade?" To this question, the table provides "yes" indications (352, 354) for a transaction involving the Lake Store and the Pond Store. The table 350 is used later to ascertain whether an inter-company trade is involved in a user's query.

When we include ICE processing in the database queries, we can express the query using a containment vector hierarchy vector or a DAG-based hierarchy vector as well as with logical expressions for the containment relationship. For example with reference back to FIG. 11, a query which involves calculating the summation of the cost of a buyer for a particular item, the query can be represented as the following logical expression to scan each data record for desired Item "Y" and desired Buyer "X":

{ItemYContainmentVector[ITEM] & BuyerXContainmentVector[BUYER]}

To incorporate ICE into the logical expression, it can be further expanded as (ItemYContainmentVector[ITEM] &

BuyerXContainmentVector[BUYER] & !InterCompanyTrade[BUYER,SELLER]). So the query can be computed as follows:

```
TOTAL=0
ForEachRecordInDatabase with ITEM,
    BUYER, SELLER dimensions, COST value
    IF (ItemContainmentVector[ITEM] &
        BuyerContainmentVector[BUYER] &
        !InterCompanyTrade[BUYER,SELLER])
    THEN TOTAL += COST
```

If, however, the Buyer and Seller are within the same set, we can instead use the following more compact expression:

```
TOTAL=0
ForEachRecordInDatabase with ITEM,
    BUYER, SELLER dimensions, COST value
    IF (ItemYContainmentVector[ITEM] &
        BuyerXContainmentVector[BUYER] &
        !BuyerXContainmentVector[SELLER])
    THEN TOTAL += COST
```

Note that the time taking to scan any single data record using the ICE expression (e.g., "(ItemYContainmentVector[ITEM] &BuyerXContainmentVector[BUYER] &!BuyerXContainmentVector[SELLER])") is constant, which makes the ICE scan of the whole database O(N). This is just one illustration of the single pass processing (described in FIG. 10) taking constant time to access a single data record even if extra expressions are incorporated into the query.

As an additional ICE example, the following example illustrates how an ICE situation may impact the query computation. As shown in FIG. 13, the data in this example is:
Lake Store sold $62.45 to Bubba;
Pond Store sold $11.76 to Shirley; and
Pond Store sold $500.00 to Lake Store.
The Buyer data 380 is organized according to the dimensional hierarchy 382, where for example, under the Lake Store element 384, $62.45 worth of Shrimp was sold to Bubba Gump.

By applying a traversal instead of a scan, we obtain the results at 400 shown in FIG. 14, where for example the "All Stores" total is $574.21. The results shown in FIG. 14, although computed in O(N) time, are incorrect in that the "All Stores" total includes an inter-company transaction (i.e., the $500 of data record 402). The correct results are shown at 420 in FIG. 15 wherein for example the All Stores' total is $74.21 (instead of $574.21).

So ICE in this particular situation eliminates the linear nature of the single pass if a grid is built, and linear scan (e.g., index vector is based on a contaminant vector) or traversal (e.g., preorder or postorder when the index vector is based on preorder/postorder values) is used. This would occur whether the linear scan is based on a contaminant vector approach or a traversal approach. Current solutions such as data retention and nested scan is O(N^2) on the rows and columns displayed which is computationally intensive. However, an O(N) approach may be used that takes advantage of the processing illustrated in FIG. 10 which takes constant time to access a data record even if extra expressions are incorporated into the query. This approach identifies the Lowest Common Parent (LCP) for the children which is computed based on hierarchy structure data and is independent of data size and runs in constant time O(1).

An example of the lowest common parent (LCP) of the Lake Store and Pond Store elements (440, 442) is All Stores 444 as shown in FIG. 16. As shown in FIG. 17, a table 500 can be created that contains the earliest "common" parent (i.e., LCP) information for the other elements. The LCP table 500 contains the LCP values (502, 504) Lake Store and Pond Store. It is noted that the LCP table can either be created by "walking up" the DAG tree, or by sorting and doing a binary search.

Figure 18:
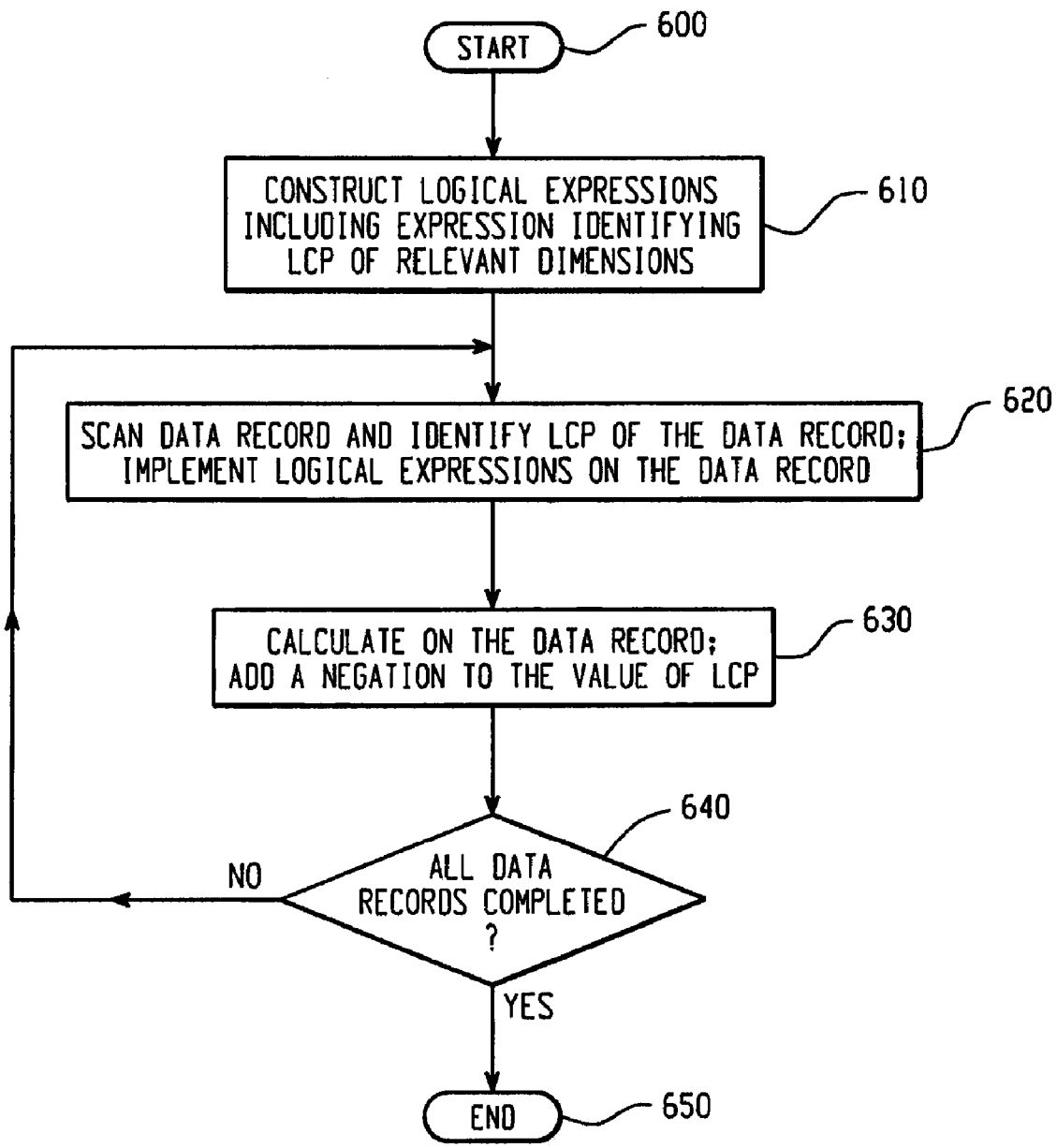
FIG. 18 is a flow chart illustrating an operational scenario involving ICE processing.

An LCP table can be used to handle an ICE situation in a pre-pass way as shown in FIG. 18. As indicated by start block 600, the method starts at 610 by constructing a logical expression representing the query. The query includes an expression that identifies the LCP for the relevant dimensions. The data records are scanned using the constructed logical expression at step 620. For an LCP of the data record, a negation (equaling the value of the data record) is added to the LCP's value at step 630. As determined by decision step 640, the scanning procedure continues until all data records are scanned. Processing ends at end block 650.

Figure 19:
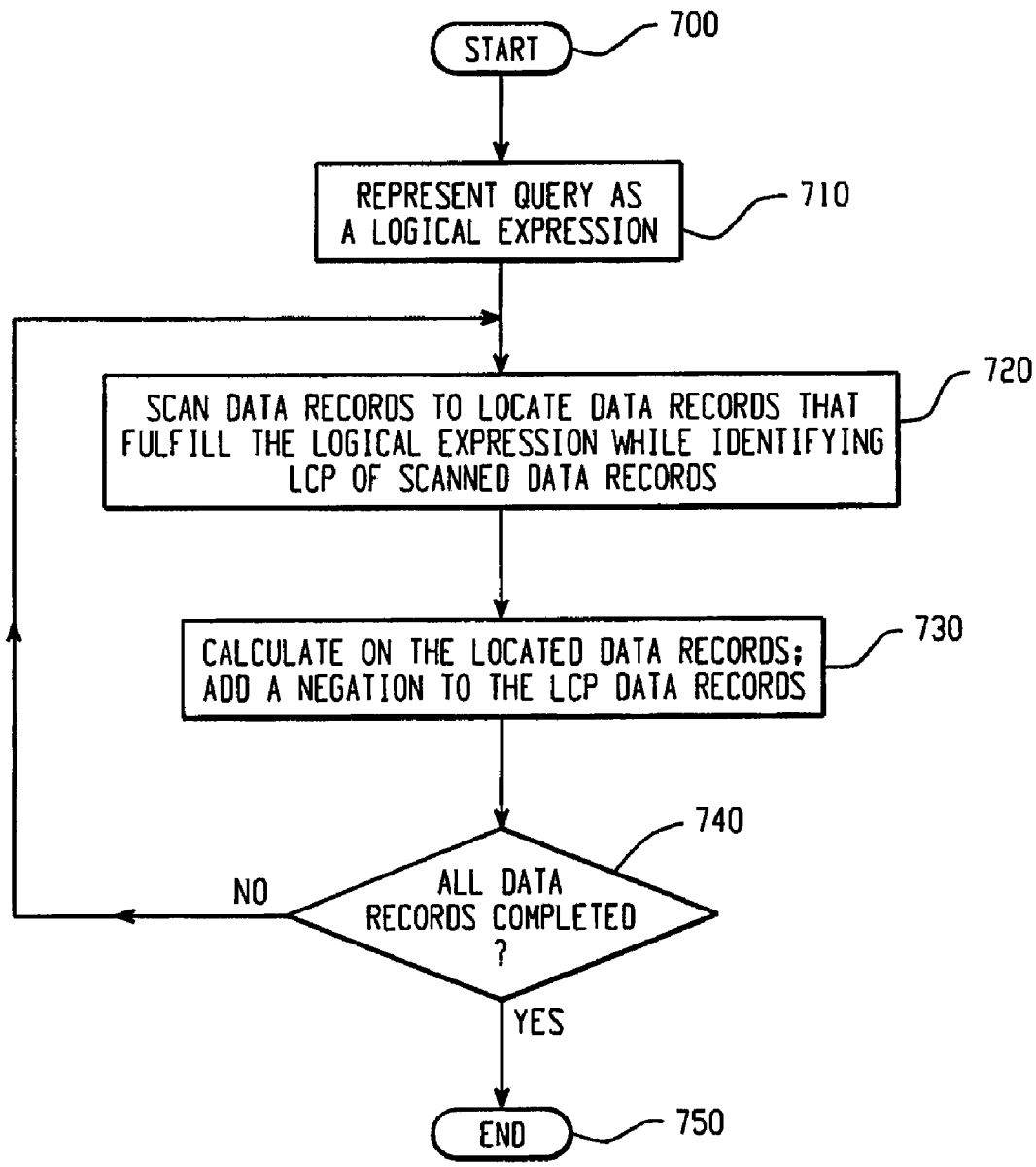
FIG. 19 is a flow chart illustrating an operational scenario involving another type of ICE processing.

The steps of the operations may be augmented or changed to suit the situation at hand. For example, another type of ICE situation may be handled in the manner shown in FIG. 19. As indicated by start block 700, the method starts at step 710 by representing the query as a logical expression. The query includes an expression that identifies the LCP of the data record for the relevant dimensions. The data records are scanned at step 720 in order to locate data records that fulfill the logical expression. Furthermore a negation equaling to the value of the data record is added to the LCP's calculation result at step 730. As determined by decision step 740, the scanning procedure continues until all data records are scanned. Processing ends at end block 750.

While examples have been used to disclose the invention, including the best mode, and also to enable any person skilled in the art to make and use the invention, the patentable scope of the invention is defined by the claims, and may include other examples that occur to those skilled in the art. For example, the systems and methods disclosed herein can allow querying of a multidimensional database which provides constant processing time (or approximate constant processing time) for each data record and which directly computes the relevant answers in one pass without computing intermediate answers.

Still further, other applications may use the methods and systems disclosed herein. For example, the methods and systems may be employed to address a situation involving double indirection for discrete siblings. Assume the query is asking for a grid of answers that is to contain a row with a range of discrete values (elements or instances) from one dimension and a column with a range of discrete values (elements or instances) from another dimension. To use the database 300 in FIG. 11 as an example, a query such as "Show me all the items sold, and for each show me what did the Gump family and All Stores buy" is asking for a grid of answers or an "answer matrix." The answer matrix would contain ITEM as a row having three discrete values: Bait, Shrimp, Worms. BUYER values would form the columns. The columns would have two discrete values: Gump family and All stores.

This query can be computed in a variety of ways, for example:
1. Compute each singleton O(N*Rows*Columns)—which treats each crossing of row and column as a singleton as described above.
2. Compute a vector O(N), then Mark and Sweep the results O(Rows+Columns).

The first is useful if the number of rows and columns displayed is relatively few, otherwise decreasing performance may make it undesirable.

The second approach is described as follows:

1. Build the grid O(N) populating the row*column crossings, for example: DO OVER ALL RECORDS Grid [Data[i].BUYER,Data[i].SELLER]+=Data[i].VALUE
2. Traverse the tree for the rest using pre-order 'visited' traversal in O(N) time Pseudocode for a sample traversal may resemble:

```
double value( )
{
  if ( !traversed ) {
    double total = 0;
    for(all children) total += kid.value( );
    retainedValue = total;
    traversed = true;
  }
  return retainedValue;
}
```

The above algorithm works in O(N) time in that a node does not have its children visited more than one time, so that a single pass of the data fills the tree, and then any node can be queried in O(1) time.

After building the array of nodes, a traversal is then applied for each dimension (i.e., one for the row and one for the column), however, this mark and sweep will run in O(N^2) time based on the cardinality of each of the members of the result set.

The query may also be analyzed to see if it falls in the typical case, which is drilldown and re-direct the rows and columns of the children to their parent nodes. This will achieve a one-pass O(N) performance level by incorporating a "rowmap" and "columnmap" into the logical expression in a manner similar to that described in handling an ICE situation. In other words, if discrete siblings are displayed (as asked for by the query) in a resultant matrix (Gump family and All stores for this example), all non-displayed children (Bubba Gump, Shirley Gump, Lake Store, Pond Store for this example) which are children of Gump Family and All Stores respectively can be redirected to node Gump Family and All Stores. The same procedure can be applied to row ITEM if necessary.

Figure 20:
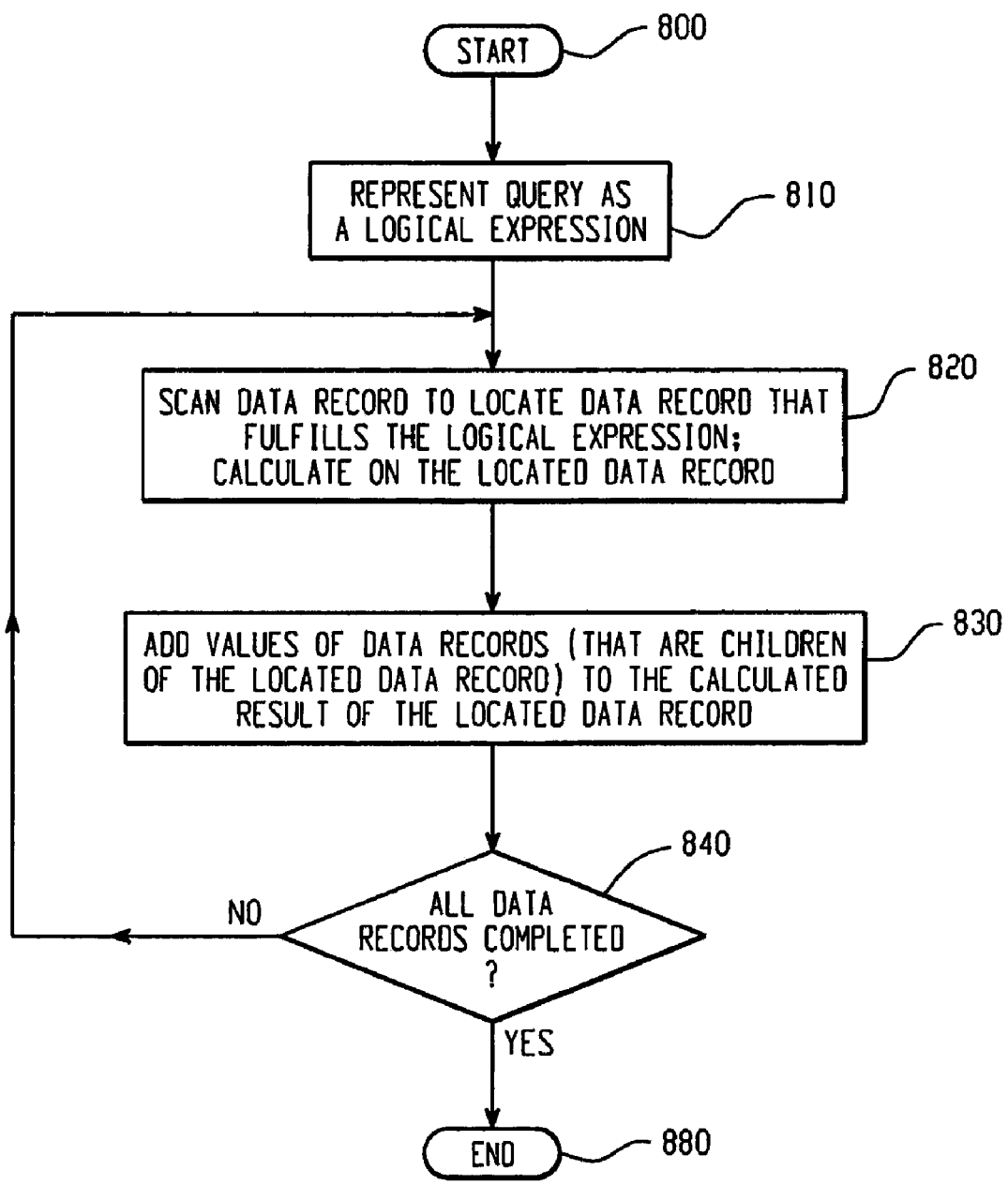
FIG. 20 is a flow chart illustrating an operational scenario involving indirection mapping for discrete siblings.

Processing of this situation is shown in FIG. 20. Start indication block 800 indicates that at step 810 the query is first represented as a logical expression. At step 820, the data records are then scanned to locate the data record which fulfills the logical expression. If desired, step 820 performs calculations on the located data record(s). At step 830, the values of data records which are the children of the located data record are added to the located data record in order to provide a drill down query answer. The step of 830 can be performed for row and/or column dimension(s).

More specifically for this example, data record #1 (ITEM=Worms, SELLER=Pond Store, BUYER=Bubba Gump, VALUE=$62.45) may be scanned using the method described as in FIG. 10. The "displayed" ITEM will be Gump Family which is the parent of Bubba Gump (which will not be displayed). The value of Bubba Gump will be re-directed to Gump Family (which will be a non-displayed value of Bubba Gump and will be added to the displayed Gump Family value). The mapping can be done via the hierarchy relationship between the elements such as the offset of the ordinal mapping if the DAG approach is used. This illustrates the elimination of the need to build intermediate values, and still leaves linear time results on the original data, regardless of the result set size of the query.

It is further noted that the systems and methods disclosed herein may be implemented on various types of computer architectures, such as for example on a single general purpose computer or workstation, or on a network (e.g., local area network, wide area network, or internet), or in a client-server configuration, or in an application service provider configuration. Also, the system's and method's data (such as hierarchical dimensional data) may be stored as one or more data structures in computer memory and/or storage depending upon the application at hand. The systems and methods may be provided on many different types of computer readable media including instructions being executable by a computer to perform the system and method operations described herein. The systems and methods may also have their information transmitted via data signals embodied on carrier signals (e.g., radio frequency carrier signals) or other communication pathways (e.g., fiber optics, infrared, etc.).

The computer components, software modules, functions and data structures described herein may be connected directly or indirectly to each other in order to allow the flow of data needed for their operations. It is also noted that a module includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The computer components may be located on a single computer or distributed across multiple computers depending upon the situation at hand.

It is claimed:

1. A computer-implemented method for analyzing data records in a MOLAP multidimensional database, comprising:

identifying, sing one or more processors, one or more data records in the MOLAP multidimensional database, wherein a data record includes a plurality of dimensions, and wherein a dimension includes a dimensional hierarchy having a plurality of elements;

generating, using the one or more processors, a dimensional hierarchy vector corresponding to the structural characteristics of a dimensional hierarchy, wherein the dimensional hierarchy vector describes a structural relationship indicating where an element appears in the dimensional hierarchy with respect to other elements within the dimensional hierarchy;

creating, using the one or more processors, one or more keys using the dimensional hierarchy vector, wherein each key is assigned to an element in the dimensional hierarchy, wherein each key is stored in a first index vector, and wherein the keys in the first index vector are used to perform a search based upon a query;

receiving a query using the one or more processors, wherein the query is used to formulate a logical expression based upon the dimensional hierarchy vector; and using the logical expression and the one or more keys that are associated with the dimensional hierarchy vector in the first index vector to generate a second index vector using the one or more processors, wherein the second index vector is used to scan the plurality of data records in the MOLAP multidimensional database in O(N) time in order to locate one or more data records that fulfill the query.

2. The computer-implemented method of claim 1, wherein assigning each key to an element uniquely identifies each element within each dimensional hierarchy.

3. The computer-implemented method of claim 1, wherein a dimensional hierarchy is defined as a directed acyclic graph (DAG).

4. The computer-implemented method of claim 1, wherein each dimensional hierarchy vector includes a preorder value, an ordinal value, and a postorder value for an element.

5. The computer-implemented method of claim 4, wherein each key has a corresponding ordinal value.

6. The computer-implemented method of claim 1, wherein each dimensional hierarchy is defined as a containment structure.

7. The computer-implemented method of claim 1, wherein the dimensional hierarchy vector is a containment vector defining a containment relationship between a particular element with respect to other elements within the dimensional hierarchy.

8. The computer-implemented method of claim 7, wherein a numeric value corresponding to the key is an enumerating sequential number of an element within the dimensional hierarchy vector.

9. The computer-implemented method of claim 1, wherein the dimensional hierarchy vector includes a key corresponding to each dimension in the plurality of dimensions.

10. The computer-implemented method of claim 1, wherein the logical expression includes one or more operators and a plurality of terms based upon the dimensional hierarchy vector.

11. A computer implemented system for analyzing data records in a MOLAP multidimensional database, comprising:
    one or more processors;
    a computer-readable storage medium containing instructions configured to cause the one or more processors to perform operations including:
    identifying one or more data records in the MOLAP multidimensional database, wherein a data record includes a plurality of dimensions, and wherein a dimension includes a dimensional hierarchy having a plurality of elements;
    generating a dimensional hierarchy vector corresponding to the structural characteristics of a dimensional hierarchy, wherein the dimensional hierarchy vector describes a structural relationship indicating where an element appears in the dimensional hierarchy with respect to other elements within the dimensional hierarchy;
    creating one or more keys using the dimensional hierarchy vector, wherein each key is assigned to an element in the dimensional hierarchy, wherein each key is stored in a first index vector, and wherein the keys in the first index vector are used to perform a search based upon a query;
    receiving a query, wherein the query is used to formulate a logical expression based upon the dimensional hierarchy vector; and
    using the logical expression and the one or more keys that are associated with the dimensional hierarchy vector in the first index vector to generate a second index vector, wherein the second index vector is used to scan the plurality of data records in the MOLAP multidimensional database in O(N) time in order to locate one or more data records that fulfill the query.

12. A computer-program product, tangibly embodied in a machine-readable non-transitory storage medium, including instructions configured to cause a data processing apparatus to:
    identify one or more data records in the MOLAP multidimensional database, wherein a data record includes a plurality of dimensions, and wherein a dimension includes a dimensional hierarchy having a plurality of elements;
    generate a dimensional hierarchy vector corresponding to the structural characteristics of a dimensional hierarchy, wherein the dimensional hierarchy vector describes a structural relationship indicating where an element appears in the dimensional hierarchy with respect to other elements within the dimensional hierarchy;
    create one or more keys using the dimensional hierarchy vector, wherein each key is assigned to an element in the dimensional hierarchy, wherein each key is stored in a first index vector, and wherein the keys in the first index vector are used to perform a search based upon a query;
    receive a query, wherein the query is used to formulate a logical expression based upon the dimensional hierarchy vector; and
    use the logical expression and the one or more keys that are associated with the dimensional hierarchy vector in the first index vector to generate a second index vector, wherein the second index vector is used to scan the plurality of data records in the MOLAP multidimensional database in O(N) time in order to locate one or more data records that fulfill the query.

* * * * *

UNITED STATES PATENT AND TRADEMARK OFFICE
CERTIFICATE OF CORRECTION

| | |
|---|---|
| PATENT NO. | : 8,065,262 B2 |
| APPLICATION NO. | : 12/907170 |
| DATED | : November 22, 2011 |
| INVENTOR(S) | : Bailey |

It is certified that error appears in the above-identified patent and that said Letters Patent is hereby corrected as shown below:

In column 10, line 39, delete "sing" and insert --using--.

Signed and Sealed this
Tenth Day of January, 2012

David J. Kappos
*Director of the United States Patent and Trademark Office*